G. P. KIDWELL.
TRAP.
APPLICATION FILED APR. 26, 1909.
945,099.
Patented Jan. 4, 1910.
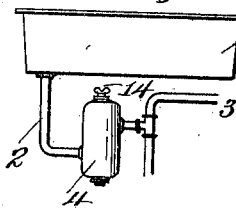
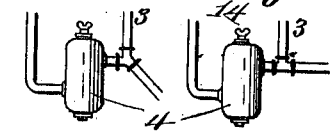
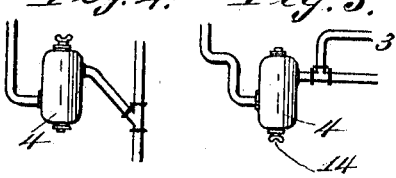
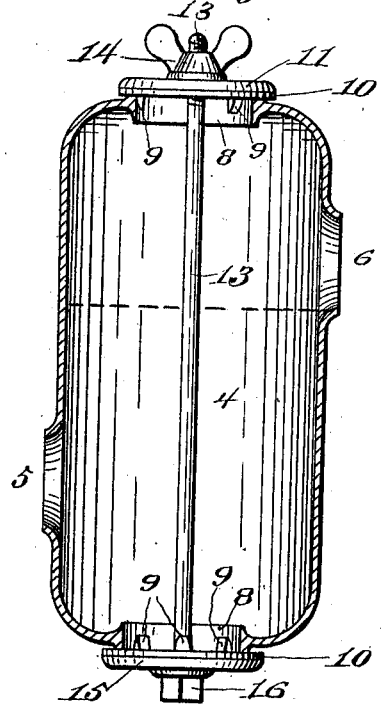
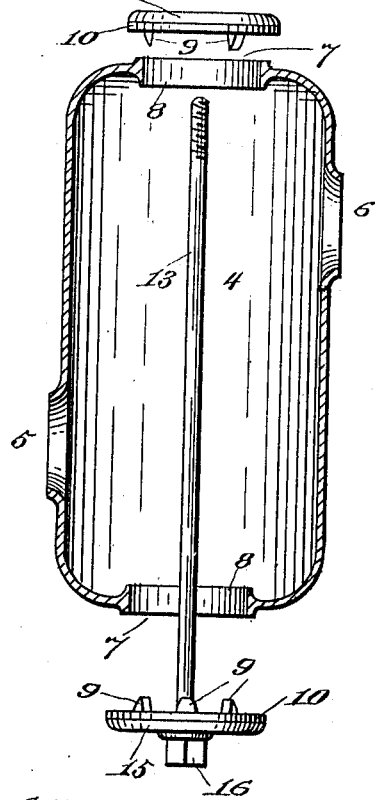
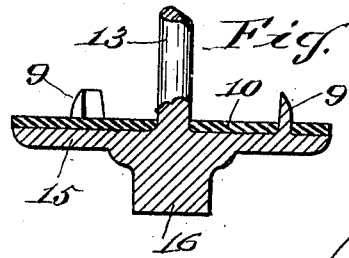
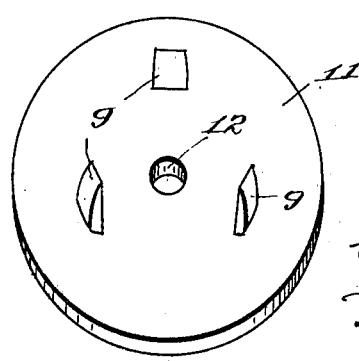
Witnesses:
Wm E. Valk Jr.
Frank F. Kidwell
Inventor
George P. Kidwell
By
C. F. Belt
Attorney.

UNITED STATES PATENT OFFICE.

GEORGE P. KIDWELL, OF WASHINGTON, DISTRICT OF COLUMBIA.

TRAP.

945,099.  Specification of Letters Patent.  Patented Jan. 4, 1910.

Application filed April 26, 1909. Serial No. 492,306.

*To all whom it may concern:*

Be it known that I, GEORGE P. KIDWELL, a citizen of the United States, residing at Washington, in the District of Columbia, have invented certain new and useful Improvements in Traps, of which the following is a specification.

This invention relates to the class of water distribution, and pertains especially to traps for water sinks, basins and the like.

The object of the invention is to provide a single cylinder or one-chamber trap of such novel and peculiar construction and arrangement of parts that access thereinto may be quickly and expeditiously made.

A further object of the invention is to provide a trap, the parts of which may be assembled and separated in a most expeditious manner and without employing special tools or implements for accomplishing the same.

A still further object of the invention is to provide a single-chamber trap having a top cap and a bottom cap connected together and automatically operated by such connection to open and close the top and bottom of the trap simultaneously.

Other objects, advantages and improved results will be found in the practical application of the trap, as will be hereinafter more fully set forth.

In the accompanying drawings forming part of this application: Figures 1, 2, 3, 4 and 5 are elevations showing the application of the invention. Fig. 6 is a central vertical sectional view of the trap, the dotted line indicating the water line. Fig. 7 is a similar view showing the caps released and in position to be removed from the trap. Fig. 8 is an enlarged sectional view of one of the caps and its tie-rod partly broken away. Fig. 9 is a perspective view of the other cap.

The same reference numerals denote the same parts throughout the several views of the drawings.

Referring to the drawings the trap is shown in Fig. 1 connected to a water-sink 1, by a pipe 2. In Figs. 2, 3 and 4, the trap is shown coupled with pipes running in various directions. In Fig. 5 the trap is shown as a running trap. In each of the said applications of the trap there is the usual vent-pipe 3 provided.

The trap 4 is composed of a single cylinder forming one chamber and has a water inlet 5, and a water outlet 6, the position of which may be changed or varied as desired or as occasion may demand. Each end of the trap or the bottom and top thereof respectively has an opening 7 vertically opposite, and a flange 8 extends inwardly from each opening. Said openings preferably being of such size as to permit ready access to the interior of the trap for the purpose of cleansing, unstopping and disinfecting. The closure for said openings consists of two circular caps one for each opening. The caps have lugs projecting from their inner face which extend through a rubber gasket 10 to hold it to the caps, and which fit within the flanges 8. The cap 11 has a central hole 12 through which one end of a tie-rod 13 extends, said end being screw-threaded for a suitable thumb-nut 14. The other cap 15 has a central nut 16 formed on its outer face, and the tie-rod 13 is fixed or attached to or formed on the cap 15, and projects centrally from the inner face of the cap 15 vertically and centrally through the trap and through the hole 12 of the cap 11. The position of the rod may be reversed so as to place the thumb-screw at the bottom of the trap as shown in Fig. 5, in the event of insufficient space at the top of the trap in applying it, or for any other reason. That is, the caps are interchangeable, so that the cap with its rod may fit the top opening of the trap as well as the bottom opening thereof. The sealing joints between the trap and the caps are such as to insure against escape of sewer gas from the trap.

It is obvious that upon unscrewing the thumb-nut, the caps are automatically loosened, and may be simultaneously removed with the tie-rod, for purposes of cleansing, repair and inspection of the trap.

It will be understood that the trap may be vented at any point desired, that it may be made in various sizes and shapes, and that the rod and caps may be varied accordingly, without departing from the spirit of my invention.

Having thus described my invention what I claim as new and desire to secure by Letters Patent is:

1. The combination, with a trap having an opening at each end for cleaning it, of a rod extending centrally through the trap, a cap formed on one end of the rod and fitting one of said openings and having the rod extending through it, and a suitable thumb-nut for the other end of the rod.

2. The combination, with a trap having an opening in each end for cleaning it, of a pair of caps for closing said openings one of which caps having a central hole and the other of said caps having a nut formed on the outside thereof, a rod fixed to and projecting from the inner face of this cap and extending through said cap-hole, and a suitable thumb-nut for fastening the rod.

In witness whereof I hereunto set my hand in the presence of two witnesses.

GEORGE P. KIDWELL.

Witnesses:
   J. Ross COLHOUN,
   WM. E. VALK, Jr.